US009136678B2

(12) United States Patent
Takaya

(10) Patent No.: US 9,136,678 B2
(45) Date of Patent: Sep. 15, 2015

(54) PROTECTOR

(71) Applicant: Yazaki Corporation, Minato-ku, Tokyo (JP)

(72) Inventor: Shigenori Takaya, Hiroshima (JP)

(73) Assignee: Yazaki Corporation, Tokyo (JP)

( * ) Notice: Subject to any disclaimer, the term of this patent is extended or adjusted under 35 U.S.C. 154(b) by 136 days.

(21) Appl. No.: 13/975,482

(22) Filed: Aug. 26, 2013

(65) Prior Publication Data

US 2014/0060923 A1    Mar. 6, 2014

(30) Foreign Application Priority Data

Aug. 29, 2012 (JP) ................. 2012-189158

(51) Int. Cl.
*H02G 3/04* (2006.01)
*B60R 16/02* (2006.01)
*H02G 3/30* (2006.01)

(52) U.S. Cl.
CPC .............. *H02G 3/04* (2013.01); *B60R 16/0215* (2013.01); *H02G 3/0437* (2013.01); *H02G 3/30* (2013.01)

(58) Field of Classification Search
CPC ..... H02G 3/04; H02G 3/0437; B60R 16/0215
USPC ....................................... 174/72 A
See application file for complete search history.

(56) References Cited

U.S. PATENT DOCUMENTS 6,268,566 B1 *  7/2001  Takiguchi et al. .......... 174/72 A
6,933,440 B2 *  8/2005  Ichikawa et al. ............. 174/507
6,959,491 B2 * 11/2005  Higgs ............................. 29/854
7,825,339 B2 * 11/2010  Suzuki ........................... 174/101
2005/0045361 A1   3/2005  Arai et al.
2005/0217888 A1  10/2005  Arai et al.
2015/0121658 A1   5/2015  Kamigaichi

FOREIGN PATENT DOCUMENTS

| EP | 2 874 255 A1 | 5/2015 |
| JP | 8-140237 A | 5/1996 |
| JP | 8-223737 A | 8/1996 |
| JP | 2000-236608 A | 8/2000 |

(Continued)

OTHER PUBLICATIONS

Extended European Search Report, dated Nov. 21, 2013, issued by the European Patent Office in counterpart European Patent Application No. 13181981.5.

(Continued)

*Primary Examiner* — Timothy Thompson
*Assistant Examiner* — Charles Pizzuto
(74) *Attorney, Agent, or Firm* — Sughrue Mion, PLLC

(57) ABSTRACT

A protector includes a bottom plate part on which a plurality of electric wires is placed on the same plane, a pair of side parts that is provided to erect from the bottom plate part so that the electric wires is interposed between the pair of the side parts, a distance between the pair of the side parts corresponding to crank-shaped curved parts of the electric wires being larger than a distance between the pair of the side parts corresponding to front and rear linear parts of the crank-shaped curved parts of the electric wires, and a protector fixing part that is provided on the bottom plate part so that the protector fixing part is positioned between the crank-shaped curved parts provided next to each other.

4 Claims, 3 Drawing Sheets

(56) References Cited

FOREIGN PATENT DOCUMENTS

| WO | 2012/070268 A1 | 5/2012 |
| WO | 2012/144097 A1 | 10/2012 |

OTHER PUBLICATIONS

Communication from the European Patent Office issued Jun. 30, 2015 in a counterpart European Application No. 13 181 981.5.

* cited by examiner

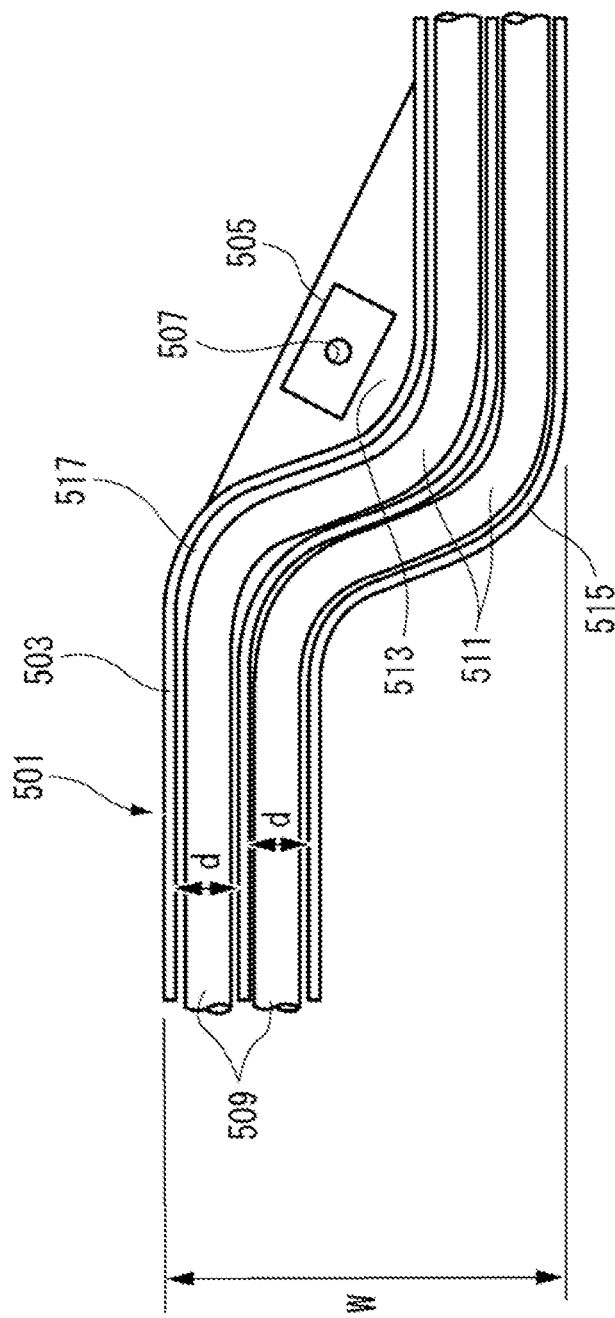
FIG. 3 -- Related Art --

PROTECTOR

CROSS REFERENCE TO RELATED APPLICATION

This application is based on Japanese Patent Applications No. 2012-189158 filed on Aug. 29, 2012, the contents of which are incorporated herein by reference.

BACKGROUND OF THE INVENTION

1. Technical Field

The invention relates to a protector that is appropriately used to arrange a wire harness.

2. Background Art

A wire harness (electric wire) is widely used for an in-vehicle wiring of an electric system of a vehicle and the like. The wire harness is partially accommodated in a protector, which is fixed to a vehicle body by a fixture such as harness clamp and is arranged at a predetermined position of the vehicle body, and is arranged at the vehicle body. There are a variety of protectors. For example, a protector disclosed in JP-A-8-140237 has a long shape in which both sidewalls are provided to erect from both sides of a bottom wall, and a center thereof in a longitudinal direction is curved. The bottom wall is provided thereon with a partition wall that extends in the longitudinal direction at the curved part. By the partition wall, the curved protector is defined with an inner periphery-side arranging path and an outer periphery-side arranging path.

For example, as shown in FIG. 3, a fastening means such as a bolt is inserted into a fixing hole 507 of a protector fixing part 505 provided to a main body 503, so that a protector 501 is fixed to a vehicle body. The protector fixing part 505 is provided using a recess-shaped space 513 that is formed at an inner side (one end-side in an electric wire arranging direction) of curved parts 511 of electric wires 509. Thereby, a size of the outermost width W of the main body is suppressed to be small, so that the main body 503 is suppressed from being enlarged. For example, if the protector fixing part 505 is provided at an outer side of convex-shaped portions 515 of the curved parts 511, the size of the outermost width W of the main body is increased. Also, an electric wire accommodation space 517 in the protector 501, through which the electric wires 509 pass, has a minimum accommodation width d within which the electric wires 509 are accommodated, considering a part variation. At this time, a linear part and the curved part 511 have the same accommodation width d.

In an electric vehicle that travels using an electric motor or a hybrid vehicle that travels using both an engine and an electric motor, a large-diameter electric wire 509 (thick electric wire) is recently used for a high tension cable connecting an inverter and a motor. The large-diameter electric wire 509 has high stiffness. Particularly, when a curved amount of the electric wire 509 is high (when a curvature is large), it is difficult to perform an arranging operation. Also, when the stiffness is high, it is not possible to absorb an extra length, which occurs upon cutting of the electric wire or upon arranging thereof, by loosening or folding the electric wire 509, which also increases an operator's arranging burden. Regarding this, when the accommodation width d of the electric wire accommodation space 517 is simply widened, the size of the outermost width W of the main body is increased, so that the main body 503 is enlarged.

The invention has been made keeping in mind the above situations, and an object of the invention is to provide a structure of a protector enabling an arranging operation of an electric wire to be easily performed.

SUMMARY OF THE INVENTION

The above object of the invention is realized by following configurations.

(1) According to an aspect of the invention, a protector includes a bottom plate part on which a plurality of electric wires is placed on the same plane, a pair of side parts that is provided to erect from the bottom plate part so that the electric wires is interposed between the pair of the side parts, a distance between the pair of the side parts corresponding to crank-shaped curved parts of the electric wires being larger than a distance between the pair of the side parts corresponding to front and rear linear parts of the crank-shaped curved parts of the electric wires, and a protector fixing part that is provided on the bottom plate part so that the protector fixing part is positioned between the crank-shaped curved parts provided next to each other.

(2) In the protector of (1), the electric wires are high tension cables.

(3) According to another aspect of the invention, a protector for protecting an electric wire includes a curve portion that has a first groove configured to guide the electric wire along a first direction, a first straight portion that has a second groove configured to guide the electric wire along a second direction which is different from the first direction and is connected to one end of the curve portion, and a second straight portion that has a third groove configured to guide the electric wire along a third direction which is different from the first direction and is connected to the other end of the curve portion. A width of the first groove in a direction perpendicular to the first direction is larger than a width of the second groove in a direction perpendicular to the second direction. The width of the first groove is larger than a width of the third groove in a direction perpendicular to the third direction.

According to the protector having the configurations (1) and (3), the width of the pair of side parts corresponding to the crank-shaped curved parts of the electric wires parallel provided is wider than the width corresponding to the front and rear linear parts of the crank-shaped curved parts, and the protector fixing part is arranged between the crank-shaped curved parts of the electric wires parallel provided. Thus, while the protector having the equivalent outermost width of the main body is provided, separated spaces between the pair of side parts, which become the electric wire accommodation spaces in the crank-shaped curved parts of the electric wires, are increased, compared to the conventional protector in which the protector fixing part is arranged at one end side in the electric wire arranging direction. The electric wire accommodation spaces corresponding to the crank-shaped curved parts are widened as the separated spaces between the pair of side parts are increased. Therefore, curved amounts of the electric wires are decreased (the curvatures thereof are reduced), so that it is possible to easily perform an arranging operation of the electric wires. Also, extra lengths of the electric wires, which occur upon cutting of the electric wires or upon arranging thereof, can be absorbed in the electric wire accommodation spaces corresponding to the crank-shaped curved parts. As a result, an operator's arranging burden is reduced.

According to the protector having the configuration (2), it is possible to easily arrange the high tensions cable having larger diameter and higher stiffness, compared to a general electric wire.

According to the protector of the invention, it is possible to easily arrange an electric wire.

The invention has been briefly described. Also, the invention will be further clarified by reading an embodiment for implementing the invention (hereinafter, referred to as 'illustrative embodiment'), which will be described later, with reference to the accompanying drawings.

BRIEF DESCRIPTION OF DRAWINGS

FIG. 3 is enlarged plan view of a main part at a state where electric wires are arranged at a protector of the related art.

DESCRIPTION OF EMBODIMENTS

Hereinafter, an illustrative embodiment of the invention will be described with reference to the drawings.

Figure 1:
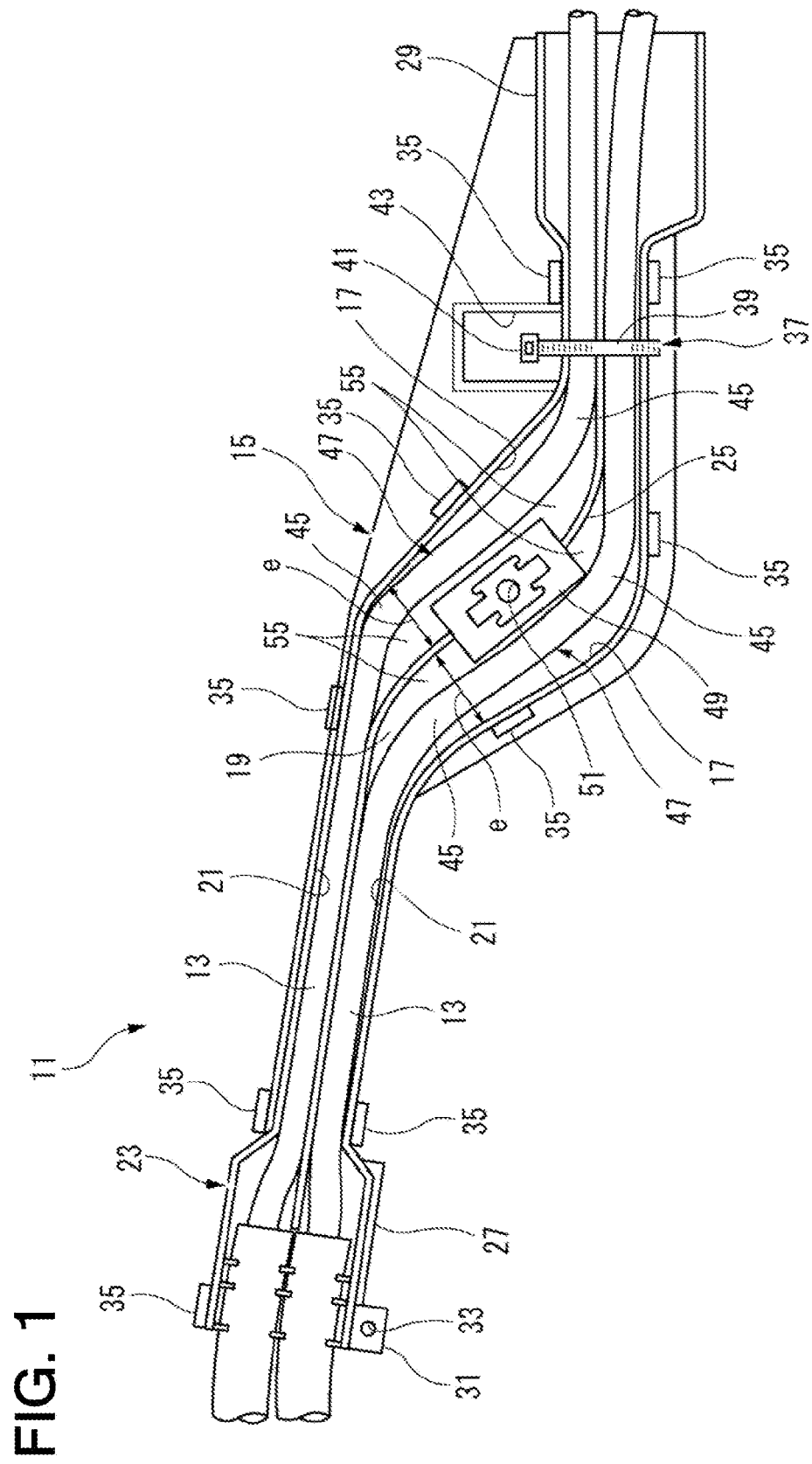
FIG. 1 is a plan view showing a state where electric wires are arranged at a protector according to an illustrative embodiment of the invention.

As shown in FIG. 1, a protector 11 of this illustrative embodiment has a main body 15 and a cover (not shown), which are combined each other to thus form a cylinder body capable of accommodating therein high tension cables 13, which are electric wires. The main body 15 has a bottom plate part 19 on which the two accommodated high tension cables 13 are placed on the same plane and a pair of side parts 17 that is spaced from each other with the two high tension cables 13 being interposed therebetween and is provided to erect from the bottom plate part 19. The pair of side parts 17 erects from both edges extending in a longitudinal direction of the long bottom plate part 19 along the high tension cables 13. That is, the main body 15 has a U-shaped section having an open upper part, which is orthogonal to the longitudinal direction. The open upper part becomes a main body opening 23 that opens an electric wire accommodation space 21 at an inner side of the main body.

In this illustrative embodiment, the two high tension cables 13 are accommodated in the main body 15. The bottom plate part 19 is provided with a partition wall part 25 that is provided to erect at a central part of the pair of side parts 17. The partition wall part 25 bisects the electric wire accommodation space 21 along the longitudinal direction. In this illustrative embodiment, the two high tension cables 13 are accommodated in the main body 15. However, the protector 11 of the invention may be configured so that one high tension cable 13 or three or more high tension cables 13 are accommodated. Also, the high tension cable 13 that is the electric wire may be a bundle of electric wires in which a plurality of electric wires is gathered into a bundle shape.

A one end-side electric wire leading part 27 is formed at one end-side of the main body 15 in the longitudinal direction and the other end-side electric wire leading part 29 is formed at the other end-side of the main body 15 in the longitudinal direction. The main body 15 is provided with a bracket part 31 for vehicle body fixation on an outer side of the one end-side electric wire leading part 27. The bracket part 31 for vehicle body fixation is formed with an engaging hole 33 for vehicle body fixation.

The cover (not shown) has a shape, which is seen from a plan view of the main body 15, i.e., a shape following the main body opening 23. The cover is formed with cover edge parts at both sides following the high tension cables 13. The cover edge parts are inserted into the inner sides of the pair of side parts 17 of the main body 15.

The main body 15 and the cover are provided with a plurality of lock parts along the longitudinal directions thereof. The lock parts engage both side parts 17 of the main body 15 and both edges of the cover each other. The lock parts are disposed at a predetermined interval along the longitudinal directions of the main body 15 and the cover. The lock parts include receiving parts 35, which are provided on outer sides of both side parts 17, and engaging pieces (not shown) that are provided to both edges of the cover and are inserted and engaged in the receiving parts 35. The receiving parts 35 are provided on the outer sides of the pair of side parts 17.

The bottom plate part 19 of the main body 15 is formed with a pair of band insertion holes into which a band part 39 of a binding band 37 can be inserted. The band insertion holes are arranged at the main body 15 in a direction (in this illustrative embodiment, an orthogonal direction) intersecting with the high tension cables 15 accommodated in the main body 15. The binding band 37 has a band shape. Both end portions of the binding band are inserted inwards through the band insertion holes of the main body 15, so that the binding band binds the high tension cables 13 arranged in the main body to the main body 15. A rear end of the band part 39 is provided with a buckle part and the buckle part 41 has a lock hole. A claw is provided in the lock hole. When a leading end of the band part 39 is inserted into the lock hole, the claw is engaged with an unevenness formed on a surface of the band part 39, so that the band part 39 is locked.

In the protector 11, the main body 15 is defined with a space part 43 for band binding, including one band insertion hole. The space part 43 for band binding, in which the buckle part 41 is accommodated, is closed by a binding space closing plate part (not shown), which is bulge-formed to the cover, when attaching the cover to the main body 15.

In the longitudinal directions of the two high tension cables 13 that are accommodated in the protector 11 of this illustrative embodiment, crank-shaped curved parts 47 in which two curved parts 45 having opposite curved directions are provided at a predetermined interval are formed.

Thus, as shown in FIG. 1, the bottom plate part 19 on which the two high tension cables 13 are placed on the same plane is curved into a crank shape, and the pair of side parts 17, which are spaced from each other with the two high tension cables 13 being interposed therebetween and are provided to erect from both edges of the bottom plate part 19, have a width D1 corresponding to the crank-shaped curved parts 47 of the high tension cables 13, which is wider than a width D2 corresponding to front and rear linear parts 44, 46 of the crank-shaped curved parts 47.

Also, the partition wall part 25 is interposed between both side parts 17, which are provided to erect from the bottom wall plate 19 along the crank-shaped curved parts 47 of the high tension cables 13, so that it partitions both side parts 17 into two electric wire accommodation spaces 21 therebetween.

Thereby, both side parts 17 and the partition wall part 25 are formed along the crank-shaped curved parts 47 of the high tension cables 13.

A tube-shaped protector fixing part 49, which opens in a rectangular shape, is formed to divide the partition wall part 25 on the bottom plate part 19 at the substantially central part of the main body 15 in the longitudinal direction so that the protector fixing part is positioned between the crank-shaped curved parts 47 of the two accommodated high tension cables 13. The cover is formed with a rectangular hole that is matched with the protector fixing part 49. When the cover is attached to the main body 15, the rectangular hole is matched with the protector fixing part 49, thereby opening outwards an inner side of the protector fixing part 49 without closing the inner side. The protector fixing part 49 is formed with a fixing hole 51 that penetrates the bottom plate part 19. A fastening means such as a bolt is inserted into the fixing hole 51 of the protector fixing part 49, so that the protector 11 is fixed to a vehicle body.

In the below, operations of the protector 11 having the above configuration are described.

Figure 2:
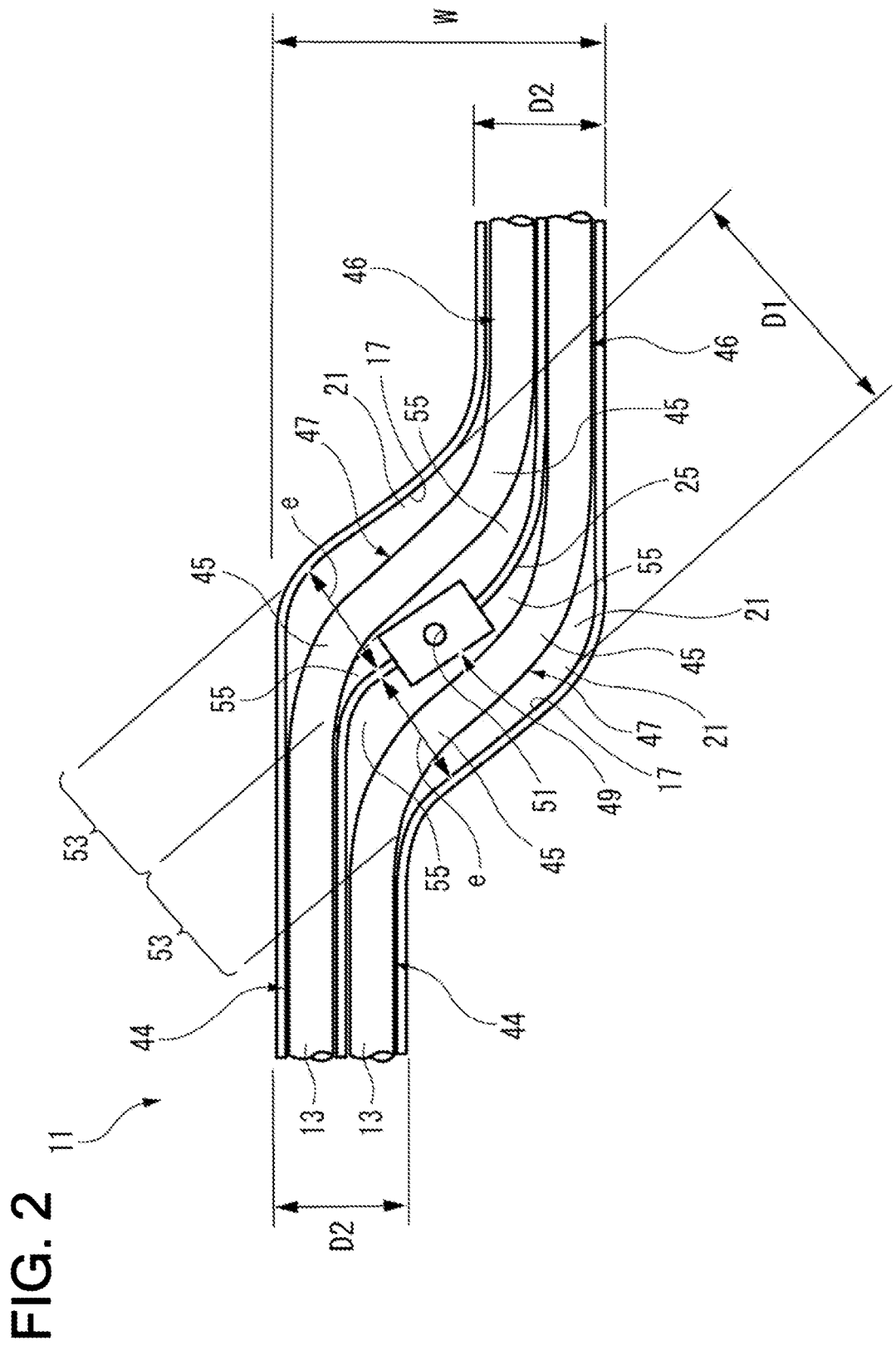
FIG. 2 is an enlarged view of a main part of FIG. 1.

As shown in FIG. 2, according to the protector 11 of this illustrative embodiment, the width D1 of the pair of side parts 17 corresponding to the crank-shaped curved parts 47 of the two accommodated high tension cables 13 is wider than the width D2 corresponding to the front and rear linear parts 44, 46 of the crank-shaped curved parts 47, and the protector fixing part 49 is arranged between the crank-shaped curved parts 47 of the accommodated high tension cables 13. Thus, while the protector 11 having the equivalent outermost width W of the main body is provided, the separated spaces 53 between the pair of side parts 17, which become the electric wire accommodation spaces 21 in the crank-shaped curved parts 47 of the high tension cables 13, are increased, compared to the conventional protector 501 (refer to FIG. 3) in which the protector fixing part 505 is arranged at one end side in the electric wire arranging direction.

That is, the separated spaces 53 between the pair of side parts 17 are increased without changing the size of the outermost width W of the main body, so that space increasing parts 55 are formed. Thereby, accommodation widths e of the electric wire accommodation spaces 21 corresponding to the crank-shaped curved parts 47 of the high tension cables 13 are enlarged.

The electric wire accommodation spaces 21 corresponding to the crank-shaped curved parts 47 are widened as the separated spaces 53 between the pair of side parts 17 are increased. Therefore, curved amounts of the high tension cables 13 are decreased (the curvatures thereof are reduced). As a result, in particular, it is possible to easily perform an arranging operation of the high tension cables 13 that are thick electric wires having high flexural stiffness. Also, extra lengths of the electric wires, which occur upon cutting of the electric wires or upon arranging thereof, can be absorbed in the electric wire accommodation spaces 21 that are widened in correspondence to the crank-shaped curved parts 47. As a result, an operator's arranging burden is reduced.

In the meantime, the protector 11 of this illustrative embodiment is applied to the high tension cables 13 having larger diameters and higher stiffness, compared to general electric wires, so that the effect of reducing the operator's arranging burden becomes more remarkable. However, the invention is not limited thereto and can be applied to a variety of electric wires such as a general electric wire and a bundle of electric wires in which a plurality of electric wires is gathered into a bundle shape.

Therefore, according to the structure of the protector 11 of this illustrative embodiment, it is possible to easily arrange the thick electric wires.

In the meantime, the structure of the protector of the invention is not limited to the above illustrative embodiment and can be appropriately changed and modified. Also, the materials, shapes, sizes, the number, arranging positions and the like of the respective constitutional elements in the above illustrative embodiment are arbitrary and are not limited insomuch as the invention can be implemented.

What is claimed is:

1. A protector comprising:
   a bottom plate part on which a plurality of electric wires is placed on the same plane;
   a pair of side parts that is provided to erect from the bottom plate part so that the electric wires is interposed between the pair of the side parts, a distance between the pair of the side parts corresponding to crank-shaped curved parts of the electric wires being larger than a distance between the pair of the side parts corresponding to front and rear linear parts of the crank-shaped curved parts of the electric wires, and
   a protector fixing part that is provided on the bottom plate part so that the protector fixing part is positioned between the crank-shaped curved parts provided next to each other.

2. The protector according to claim 1, wherein the electric wires are high tension cables.

3. A protector for protecting an electric wire comprising:
   a curve portion that has a first groove configured to guide the electric wire along a first direction;
   a first straight portion that has a second groove configured to guide the electric wire along a second direction which is different from the first direction and is connected to one end of the curve portion; and
   a second straight portion that has a third groove configured to guide the electric wire along a third direction which is different from the first direction and is connected to the other end of the curve portion,
   wherein a width of the first groove in a direction perpendicular to the first direction is larger than a width of the second groove in a direction perpendicular to the second direction, and
   the width of the first groove is larger than a width of the third groove in a direction perpendicular to the third direction.

4. The protector according to claim 3, wherein the electric wire is high tension cables.

* * * * *